US012645285B2

(12) United States Patent
Codina Candel

(10) Patent No.: US 12,645,285 B2
(45) Date of Patent: Jun. 2, 2026

(54) ORALLY ACTUATED CONTROL DEVICE

(71) Applicant: XPND TECHNOLOGIES, SL, Arenys de Munt (ES)

(72) Inventor: Narcís Codina Candel, Arenys de Munt (ES)

(73) Assignee: XPND TECHNOLOGIES, SL, Arenys de Munt (ES)

( * ) Notice: Subject to any disclaimer, the term of this patent is extended or adjusted under 35 U.S.C. 154(b) by 65 days.

(21) Appl. No.: 18/876,527

(22) PCT Filed: Jun. 19, 2023

(86) PCT No.: PCT/ES2023/070400
§ 371 (c)(1),
(2) Date: Dec. 18, 2024

(87) PCT Pub. No.: WO2023/247811
PCT Pub. Date: Dec. 28, 2023

(65) Prior Publication Data
US 2025/0238074 A1      Jul. 24, 2025

(30) Foreign Application Priority Data

Jun. 20, 2022    (ES) ................................ U202231037

(51) Int. Cl.
*G06F 3/01*          (2006.01)
*G06F 3/0338*        (2013.01)
(Continued)

(52) U.S. Cl.
CPC .............. *G06F 3/011* (2013.01); *G06F 3/016* (2013.01); *G06F 3/0338* (2013.01); *G06F 3/03547* (2013.01); *A61C 19/00* (2013.01)

(58) Field of Classification Search
CPC ........ G06F 3/011; G06F 3/016; G06F 3/0338; G06F 3/03547; A61C 19/00; H01H 3/14; A61F 4/00; A61F 2/68
(Continued)

(56) References Cited

U.S. PATENT DOCUMENTS 5,212,476 A * 5/1993 Maloney ................ A61B 5/394
                                                    455/100
5,460,186 A    10/1995 Buchhold
(Continued)

FOREIGN PATENT DOCUMENTS

RU          2245692 C2    2/2005
WO       03/013402 A1    2/2003
WO    2007/059614 A1    5/2007

OTHER PUBLICATIONS

WIPO/ISA/EP, International Search Report and Written Opinion issued in corresponding International Application No. PCT/ES2023/070400 on Sep. 29, 2023, 13 pages.
(Continued)

*Primary Examiner* — Omar Casillashernandez
(74) *Attorney, Agent, or Firm* — J. Peter Paredes; Amin Wasserman Gurnani LLP

(57) ABSTRACT

A mouth-operated control device comprising an arched casing (10) configured for at least part of the casing (10) to be arranged between a maxillary dentition and a mandibular dentition of the user in an operating position, a first at least bidirectional input interface (21) housed in the concave region of the casing (10) and accessible to the tongue of the user; a second at least bidirectional input interface (22) in the part of the casing (10) intended for being arranged between the maxillary dentition and the mandibular dentition selected to be arranged facing the mandibular dentition of the user, allowing the operation thereof with the relative movement between the maxillary dentition and the mandibular denti-
(Continued)

tion of the user; and a control electronics (30) connected to all the input interfaces (21, 22, 23) for the transmission of control signals to an external device.

13 Claims, 4 Drawing Sheets

(51) Int. Cl.
    *G06F 3/0354*         (2013.01)
    *A61C 19/00*         (2006.01)
(58) Field of Classification Search
    USPC ........................................................ 340/407.1
    See application file for complete search history.

(56) References Cited

U.S. PATENT DOCUMENTS

| | | |
|---|---|---|
| 2004/0164881 A1 | 8/2004 | Mok et al. |
| 2006/0071781 A1 | 4/2006 | Ondracek |
| 2013/0213409 A1* | 8/2013 | Podmore .............. A61H 9/0057 |
| | | 128/848 |
| 2020/0155277 A1* | 5/2020 | Clark ...................... A61C 7/10 |

OTHER PUBLICATIONS

WIPO/IPEA/EP, International Preliminary Report on Patentability issued in corresponding International Application No. PCT/ES2023/070400 on Feb. 26, 2024, 6 pages.

\* cited by examiner

ORALLY ACTUATED CONTROL DEVICE

CROSS-REFERENCE TO RELATED APPLICATIONS

The present application claims priority to PCT application serial no. of PCT/ES2023/070400 filed on Jun. 19, 2023, which claims priority to Spanish application serial no. U202231037, filed on Jun. 20, 2022, each herein incorporated by reference in their entireties.

TECHNICAL FIELD

The present invention relates to a control device, i.e., a device which serves to control other devices, operated using the mouth, i.e., the control device is intended to be operated by means of the mouth.

Control devices of this type are often used by people with mobility issues in their limbs such as, for example, quadriplegics, for controlling motorized wheelchairs or for controlling computers, smart phones, or other computing or communication devices.

However, the control device also has other applications for users without mobility issues, for example, for people whose hands must be free to perform other tasks, or simply to increase their productivity or speed in controlling different external devices.

Some examples of these other uses can be, for example, the control of virtual reality environments, the control of different external support devices by people who perform high-precision tasks with their hands such as, for example, surgeons, or simply operators who control machinery but can simultaneously perform other tasks with their hands.

STATE OF THE ART

Mouth-operated control devices are known.

For example, some devices which allow a joystick to be held in front of the mouth, inside the mouth, or under the chin to generate control commands, but which only allow generating a limited number of simultaneous control commands, whereby the use thereof is slow, are known. Furthermore, many of these control devices are bulky and not very usable.

Some devices that can be held by the user biting on same, which improves their ergonomics and usability, are also known, but they still present the problem of the use thereof being slow.

This is particularly relevant, for example, when these devices are used to control navigation, particularly for navigation in a three-dimensional environment, such as a virtual reality or augmented reality environment, or for the control of devices provided with more than two axes of freedom of operation, such as drones, articulated arms, etc.

Some of these known prior art devices which have the aforementioned problems are described, for example, in documents U.S. Pat. No. 5,460,186A, US2006071781A1, and US2004164881A1.

Document U.S. Pat. No. 5,212,476A describes a mouth-operated control device including a first input device located, when in use, in the palate region of the user operable by the user's tongue and also including switches activable by the mating of the teeth and by a side movement of the jaw. Those two switches provide a single input parameter from a movement in the vertical direction Z and a single input parameter from a movement in the transverse horizontal direction X, but not bidirectional input signals in each of those two orthogonal directions, preventing a navigation control through those switches.

The present invention solves the preceding and other problems.

BRIEF DESCRIPTION OF THE INVENTION

The present invention relates to a mouth-operated control device as described in claim 1.

The proposed control device comprises, in a way that is known per se:

an arched casing defining a concave region and a convex region configured to maintain, in an operating position, at least part of the casing between a maxillary dentition and a mandibular dentition of a user, with the casing preferably being completely housed inside the buccal cavity of the user;

a first input interface, which is at least bidirectional, attached to the casing in the concave region of the casing, i.e., oriented in a first anteroposterior direction, and preferably located in a central area of the control device intended to be behind the user's incisors, being able to be operated by the tongue of the user when the casing is in the operating position.

It is understood that the arched casing has a geometry in the form of an arch similar to the arch defined by the maxillary dentition, with the concave region being that region of the casing surrounded by the arch defined by the casing, and housing the tongue in the operating position, and with the convex region being that region of the casing externally surrounding the arch defined by the casing.

It will also be understood that an input interface is a device which allows a user to generate control commands for an external device. Said control commands are usually generated by means of the input interface detecting a movement of a part of the user, although other alternatives are also contemplated, such as, for example, detecting the voice of the user, or an increase in the pressure of the air inside the buccal cavity.

In this case, the first input interface detects the movement of the tongue of the user, preferably of the tip thereof, and is an at least bidirectional input interface, i.e., an interface that detects movements on at least two different axes, typically an X axis (transverse horizontal) and a Z axis (vertical), of the three X axis (transverse horizontal), Y axis (anteroposterior horizontal), and Z axis (vertical) that are orthogonal to one another defined by the casing when it is in the operating position inside the mouth of an upright user. This allows the first input interface to detect, for example, the upward, downward, rightward, and leftward movement of the tip of the tongue, and also all the diagonal movements resulting from the combinations of two of said movements by means of combining said detections.

The casing will be in the operating position when it is housed completely inside the buccal cavity of a user and with at least one part thereof located between the maxillary dentition (the upper teeth) and the mandibular dentition (the lower teeth) of the user, although no clenching force is required to be exerted in order to consider that said casing is in the operating position.

The anteroposterior direction is understood to be a horizontal direction aligned with the length of the buccal cavity from the base thereof to the mouth, for example coinciding with the Y axis, the craniocaudal direction is a vertical direction, for example coinciding with the Z axis, and the interaural direction is a horizontal direction perpendicular to the anteroposterior direction, for example coinciding with direction X.

The present invention also proposes the control device to further comprise:

a second input interface attached to the casing in the part of the casing intended for being arranged between the maxillary dentition and the mandibular dentition and for being arranged, in the operating position, facing the mandibular dentition of the user, allowing the operation thereof with the relative movement between the maxillary dentition and the mandibular dentition of the user; and control electronics, integrated in the casing, connected to all the input interfaces for the transmission of control signals generated by the input interfaces to an external device.

The second input interface is adapted to detect movements bidirectionally in at least a transverse horizontal direction and in an anteroposterior direction orthogonal to each other and in diagonal directions resulting from the combination of these transverse horizontal and anteroposterior directions.

In this case, the second input interface is intended to detect movements on at least two different axes, for example X and Y.

Like the first input interface, it is proposed that the second input interface is a bidirectional input interface, i.e., it allows detecting movements of parts of the user in two orthogonal directions or diagonal directions resulting from the combination of these two directions.

All the signals generated by all the input interfaces are managed by control electronics integrated in the casing, which transmit said signals to an external device by means of wireless signals emitted by an antenna integrated in the control electronics. The control electronics can also receive wireless signals from the external device through said antenna.

The external device can be any type of electrical or electronic device. Some examples of external devices to be controlled are, for example, a vehicle, an electric wheelchair, a remote controlled vehicle, a flying drone, a robotic arm, industrial machinery, any computing device with computing capability provided with one or more displays, such as a computer, a smart phone, a communication device, a video game console, or the like, for example for controlling a three-dimensional virtual environment, etc. The proposed device also allows dedicating each input interface to the control of a different external device or to a different function of the same external device.

By including at least two input interfaces, with each being at least a bidirectional input interface, the proposed control device allows increasing the speed of interaction of the user with the external device to be controlled.

Based on the foregoing, it is understood that the first and/or second input interfaces will be two-dimensional, i.e., with movement detection on two axes orthogonal to one another.

Despite the foregoing, the first and/or second input interfaces are preferably bidirectional input interfaces with a push-button, i.e., with the capacity to also detect a pressure on the interface in the direction of a third axis perpendicular to the two orthogonal axes of movement detection, or tridirectional input interfaces, i.e., with movement detection on three axes orthogonal to one another.

It will be understood that a push-button can be a button or an optical occlusion detector capable of detecting when the surface of the optical detector is completely covered, for example, by the tongue.

Optionally, it is contemplated that the control device also includes:

a third input interface in connection with the control electronics and attached to the casing in a third position coinciding with the convex region of the casing, selected to be accessible to the upper and/or lower lips of the user in the operating position; and/or a fourth input interface in connection with the control electronics and attached to the casing, said fourth input interface being an accelerometer; and/or a fifth input interface in connection with the control electronics and attached to the casing, the fifth input interface being a microphone, or a microphone adjacent to the first input interface, or a combination of an airflow direction detector and a microphone adjacent to the first input interface, connected to a voice recognition device; and/or at least one sixth input interface in connection with the control electronics and attached to the casing in a position adjacent to the first input interface, each sixth input interface being a push-button; and/or a seventh input interface in connection with the control electronics and attached to the casing, the seventh input interface being a pressure detector for detecting the pressure of the air in the buccal cavity.

The third input interface can be a push-button, a unidirectional input interface, a bidirectional input interface, a bidirectional input interface with a push-button, or a tridirectional input interface.

The fourth input interface can be an accelerometer with between one and three axes, six axes, or nine axes. The accelerometer will allow detecting the movements of the head of the user.

The fifth input interface allows detecting the voice of the user wearing the device, and a voice recognition device, integrated in the control electronics or the external device which is in communication with the control electronics, allows identifying the sounds emitted by the user such as, for example, words or voice commands, and executing actions in response to the identified sounds.

In a preferred embodiment the microphone is located in a position adjacent to the first input interface, i.e. in a central position of the mouth-driven control device, which will be close to lips of the user, where the sound of the user's voice is more recognizable, allowing the recognition of voice at lower volume, for example whispering or even at a sub-audible volume, i.e. at a volume lower than the whispering volume.

It is also contemplated that the fifth input interface may include, in combination with the microphone adjacent to the first input interface, an airflow direction detector, which allows detecting whether air is expired or aspirated from the user's mouth. By combining the information obtained by the microphone with the information obtained by the airflow direction detector, the voice recognition device can recognize, with much higher accuracy, words pronounced at a sub-audible volume.

The airflow direction detector may be, for example, a recognition system which, by analyzing the sound captured by the microphone, is capable of distinguishing the sound of air entering the mouth and the sound of air leaving the mouth. It may also consist of two microphones, placed at different distances from the lips, allowing to detect differences between the sound of the two microphones to determine whether the air flow is entering or leaving the mouth. Other examples of flow direction detectors are also contemplated.

Each sixth input interface will be at least one push-button which, as mentioned above, can be a button or an optical occlusion detector. Each sixth input interface will be located adjacent to the first input interface, for example, one on each side thereof, in the concave region of the casing, therefore being accessible to the tongue so that it can press on it. Preferably, the sixth input interfaces will be located in a position of the casing intended for being arranged almost behind the canines of the maxillary dentition in the operating position.

The seventh input interface can be a pressure detector for detecting the pressure of the air contained in the buccal cavity, which allows the user to provide control commands by means of controlling the pressure of the air contained inside the buccal cavity.

Optionally, the casing also integrates, in connection with the control electronics, at least one bone conduction speaker, i.e., a speaker which, in contact with the teeth of the user, will transmit sound in the form of vibration through the teeth and the skull to the ears of the user. The bone conduction speaker will preferably be housed in a rear part of the device intended for being arranged facing the molar teeth of the maxillary dentition of the user. Optionally, the device can include two bone conduction speakers, one on each side, to provide stereo sound.

Said at least one bone conduction speaker will be connected to the external device through the control electronics, allowing for example acoustic signals to be received, for example, in response to the operation of the input interfaces or in response to signals received from the external device, even allowing verbal intercommunication with other users.

The control device can further integrate in the casing at least one haptic emitter or at least one vibration-generating haptic emitter, connected to the control electronics. This haptic emitter can supply information to the user, for example, in response to the operation of the input interfaces or in response to signals received from the external device.

It is also contemplated that the second input interface can have two sets of sensors, located on symmetrical sides of the dental attachment, to improve mandibular movement detection.

Other features of the invention will become apparent in the following detailed description of an embodiment.

BRIEF DESCRIPTION OF THE FIGURES

The foregoing and other advantages and features will be better understood based on the following detailed description of an embodiment in reference to the attached drawings which should be interpreted in an illustrative and non-limiting manner. In the drawings.

DETAILED DESCRIPTION OF AN EMBODIMENT

Figure 1:
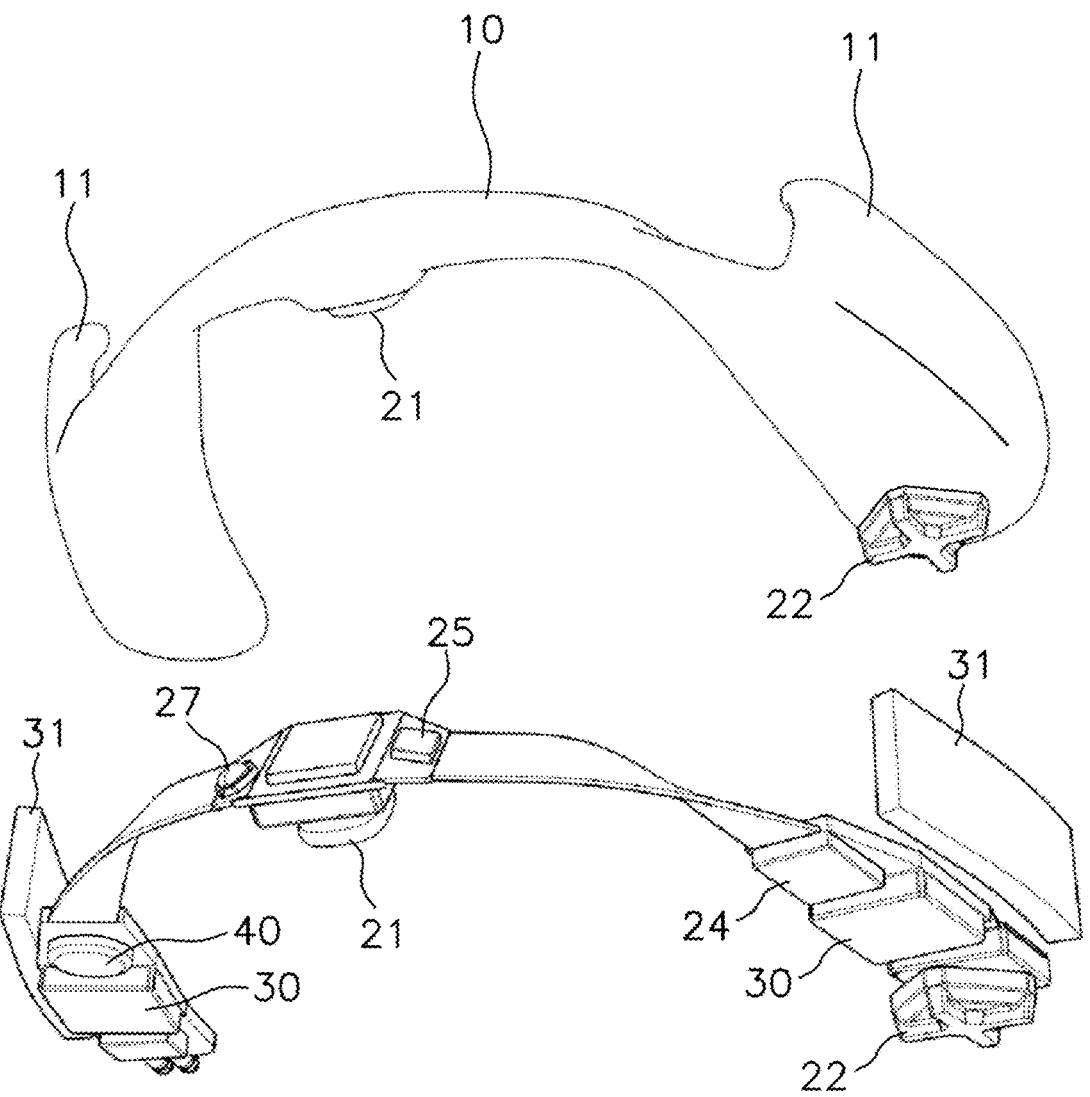
FIG. 1 shows an exploded perspective view, from a bottom anterior point of view, of the control device according to a first embodiment, showing the casing with the dental attachments at the top and showing the rest of the components of the device separated from the casing at the bottom.

The attached figures show illustrative, non-limiting embodiments of the present invention.

The present embodiment of the invention consists of a mouth-operated control device. The control device comprises a casing 10 intended for being arranged completely housed inside the buccal cavity of a user when it is in an operating position, with at least part of the casing (10) being housed between the maxillary dentition and the mandibular dentition of the user. The control device is preferably fixed to the maxillary dentition when in operating position, allowing the user to open the mouth without the control device becoming dislodged and even allowing the user to speak.

The casing 10 has an arched shape that reproduces the arched shape of the maxillary dentition and defines a concave region on the concave side of the arched casing which, in the operating position, will house the tongue, and a convex portion on the convex side of the arched casing. According to one embodiment, the casing may comprise two flattened side portions, each defining an upper surface intended for being arranged below a side part of the maxillary dentition, a lower surface intended for being arranged above the side parts of the mandibular dentition, with one of the side portions housing the second input interface 22 on the lower surface thereof. A central portion housing the first input interface 21 is obtained by connecting the two side portions.

The central portion can be, at least for the most part, above a plane defined by the upper surfaces of the two side portions, therefore being arranged behind the incisor teeth of the maxillary dentition. In such case, said central portion will define a front surface intended for being arranged facing the interior curve of the incisor teeth of the maxillary dentition in the operating position, and a rear surface housing the first input interface 21 accessible to the tongue.

Preferably, a casing 10 also includes a dental attachment 11, or a flexible dental attachment 11, defining a dental housing intended for housing therein, in the operating position, parts of the maxillary dentition of the user by fixing the casing 10 to the maxillary dentition.

When the dental attachment is flexible, it can deform elastically in the presence of the parts of the maxillary dentition in the dental housing by providing an elastic force which presses the dental attachment against the parts of the maxillary dentition housed in the dental housing, preferably in areas close to the gingival line where the teeth meet the gum.

Figure 2:
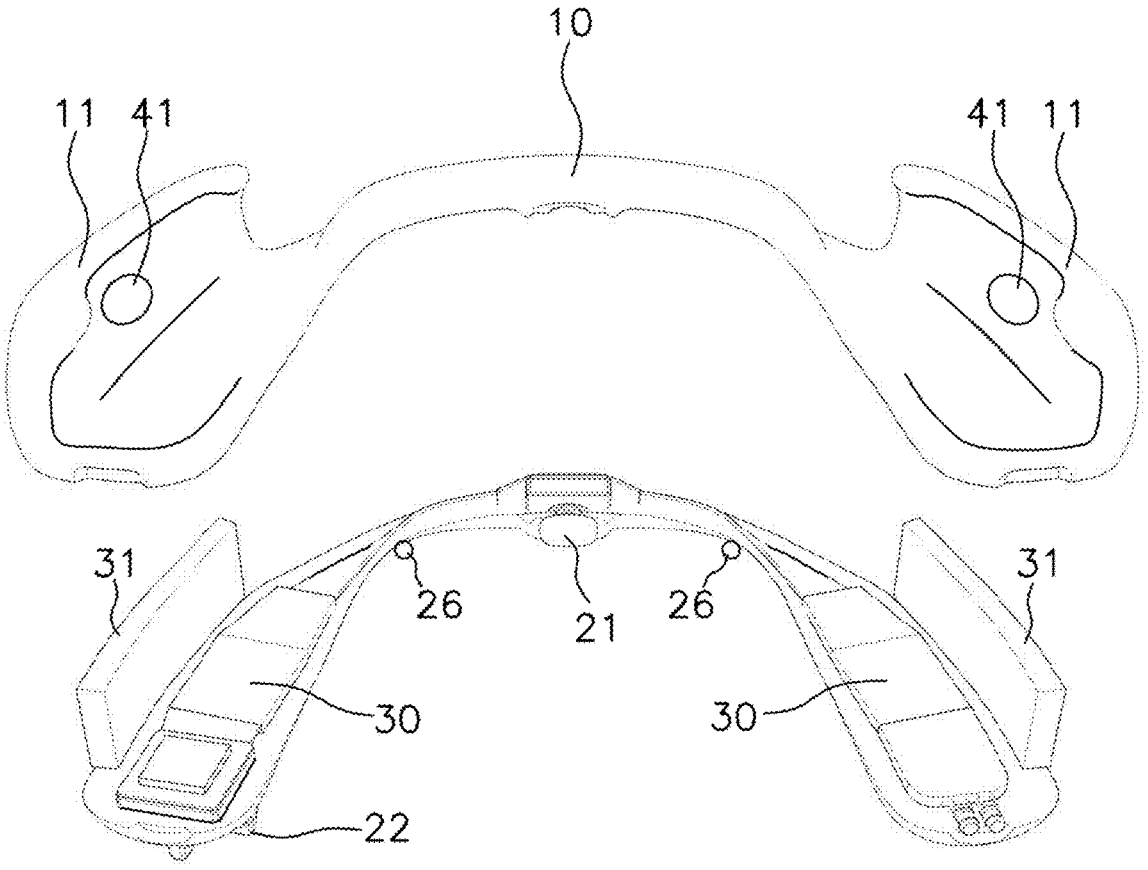
FIG. 2 shows an exploded perspective view of the control device shown in FIG. 1, from a top posterior point of view.
Figure 3:
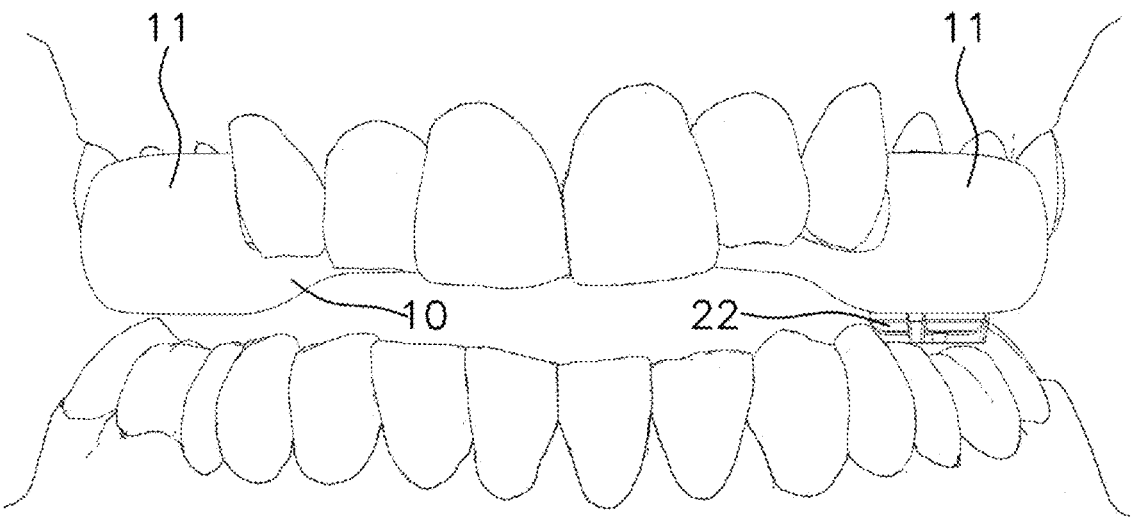
FIG. 3 shows the front of the device shown in FIG. 1 in an operating position fixed to the maxillary dentition of a user, with part of the casing being arranged between the maxillary dentition and the mandibular dentition.
Figure 4:
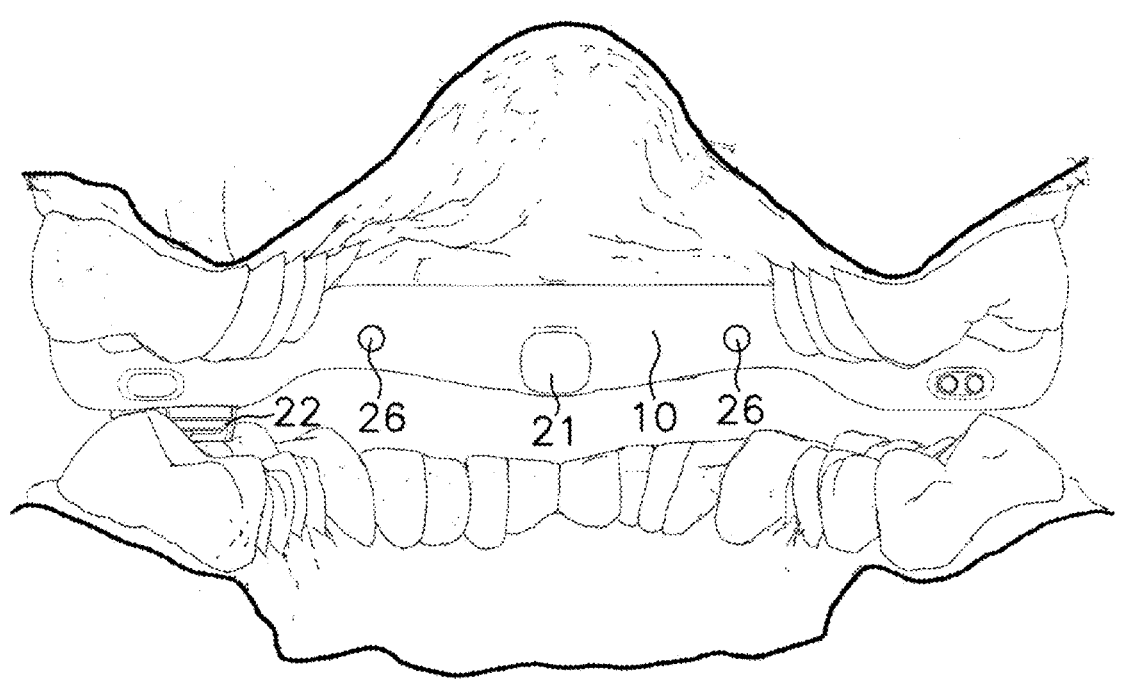
FIG. 4 shows a view of the device in the operating position shown in FIG. 3, from the inside of the buccal cavity.
Figure 5:
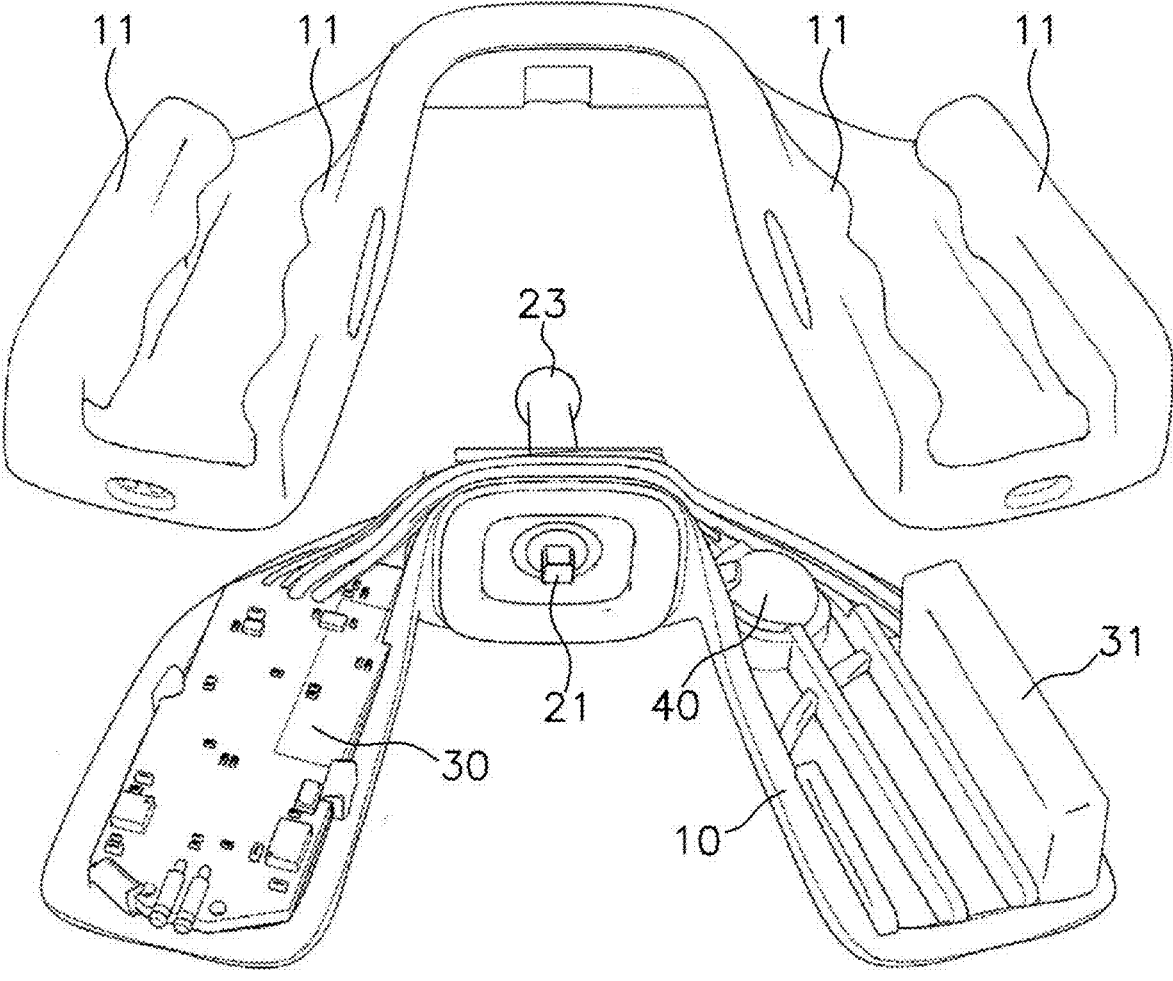
FIG. 5 shows an exploded perspective view, from a top posterior point of view, of the control device according to a second embodiment provided with a third input interface and with the casing being provided with a rigid lower half and a less rigid or flexible upper half which integrates dental attachments both in the concave region and in the convex region of the casing.

In one embodiment, the dental housing is an arched housing the ends of which are at least externally surrounded, on the convex exterior thereof, by two almost symmetrical dental attachments 11, and the central part of which is internally surrounded, on the concave interior thereof, by a central part of the casing 10 housing the first input interface 21, as shown in FIGS. 1 to 4.

According to a preferred embodiment, the dental attachment 11 can include two facing external retainers protruding from the casing 10 on symmetrical sides of the casing 10, in the convex region, i.e., on the exterior thereof, in order to be applied against an outer surface of the maxillary dentition; and/or two internal retainers with their backs facing each other, protruding from the casing 10 on symmetrical sides of the casing 10, in the concave region, i.e., on the interior thereof, in order to be applied against an inner surface of the maxillary dentition.

When applied on the casing defined by a central portion and two side portions, this can include the two facing external retainers, each fixed to a side portion of the casing 10 above the upper surface of the side portions and adjacent to the convex region, i.e., on the exterior thereof, in order to be applied against an outer surface of the maxillary dentition; and/or two internal retainers with their backs facing each other, each being fixed to a side portion of the casing 10 above the upper surface and adjacent to the concave region, i.e., on the interior thereof, in order to be applied against an internal surface of the maxillary dentition.

When both the external and internal retainers exist, they can work together to elastically press the right and left parts of the maxillary dentition, thereby retaining the casing 10.

Alternatively or additionally, it will be the entire arched casing which deforms elastically when the dental retainers are coupled to the maxillary dentition, opening or closing the arched geometry thereof, providing elastic pressure and facilitating the adaptation thereof to users with different maxillary dentitions.

According to one embodiment, a part of the casing, which contains the first input interface and the second input interface, is rigid, ensuring a precise positioning of both input interfaces, with the rest of the casing being flexible, allowing the opening or closing of the arched geometry in order to facilitate the adaptation thereof to users with a maxillary dentition having a different width.

The dental attachment therefore provides a point for the anchoring of the control device to the buccal cavity.

Optionally, the casing 10 may comprise a frame 12, or a rigid frame 12, to which at least part of the control electronics is fixed, and wherein each of the two external retainers and/or each of the two internal retainers is formed by a part of the frame 12 that is coated, at least on a face that is facing the dental housing, with a flexible, cured moldable or thermoformable material fixed to the frame 12.

The flexible material will adapt to the shape of the teeth when placing the device in the operating position, providing a firm and comfortable fixing.

The cured moldable material allows, before the device is used for the first time, a user to place the device in the operating position, with the moldable material still being in a plastic state. Subsequent curing of the material will fix its shape in correspondence with the shape of the maxillary dentition of the user, providing a comfortable and precise fixing of the device. The cured material can be rigid or flexible.

The thermoformable material allows adopting a plastic state by means of heating. Like in the case of the cured moldable material, this allows placing the device in the operating position with the thermoformable material in a plastic state so that, upon cooling, it adopts a shape complementary to the shape of the maxillary dentition of the user. The thermoformable material in a non-plastic state can be rigid or flexible.

The casing 10 may also comprise a frame 12, or a rigid frame 12, to which at least part of the control electronics is fixed, and wherein the dental attachment 11 can be formed by a flexible, cured moldable or thermoformable material fixed to the frame 12 or by a material that is overmolded on top of or around the frame 12.

It is also proposed that the control electronics 30 integrate at least one non-flat molded electronic sheet on which at least most of the components connected to the control electronics 30 are fixed.

In such case, it is contemplated that the dental attachment 11 is formed by a flexible, cured moldable or thermoformable material fixed to the mentioned at least one molded electronic sheet or by a material that is overmolded on top of or around the mentioned at least one molded electronic sheet.

In other words, the control electronics 30 can include electro-conductive tracks and surface mount electronic components integrated on a surface of molded thermoplastic material with a non-flat geometry adapted to the geometry of the device.

The control device includes a first input interface 21 and also a second input interface 22.

The first input interface 21 and the second input interface 22 are at least bidirectional input interfaces, i.e., each of said interfaces can detect movements of parts of the user in two different directions, typically the vertical direction Z and the horizontal direction X, or the horizontal direction X and the anteroposterior direction Y, although preferably they can also include a push-button to detect a pressing action.

All the input interfaces are connected to control electronics 30 that transmit the control commands generated by said input interfaces to a remote device to be controlled.

The first input interface 21 is intended for being arranged inside the mouth, being able to be operated by the tongue of the user when the casing is in the operating position. To achieve this, the first input interface 21 is attached to the casing 10 in a first position contained in the concave region of the casing 10, within reach of the tongue.

The second input interface 22 is intended for being able to be operated with the relative movement between the maxillary dentition and the mandibular dentition of the user when the casing is in the operating position, i.e., for detecting the movement of the mandible with respect to the rest of the skull. This is achieved by locating the second input interface 22 in a second position located below the portion of the casing (10) intended for being housed between the maxillary dentition and the mandibular dentition. The second input interface 22 will preferably allow detecting movements in the anteroposterior horizontal direction Y and in the transverse horizontal direction X.

Optionally, in addition to the first and second input interfaces 21, 22, the device can include a third input interface 23 intended for being able to be operated with the movement of the upper and/or lower lips when the casing 10 is in the operating position. To achieve this, the third input interface 23 is attached to the casing 10 in a third position, contained in the convex region of the casing 10, at a front end of the casing. The third input interface 23 will preferably allow detecting a pressing action, and/or detecting movements in the vertical direction Z and/or in the transverse horizontal direction X.

According to an additional embodiment of the invention, the first input interface 21, and/or the second input interface 22, and/or the third input interface 23 is a joystick or a touch panel or an optical sensor suitable for detecting a movement without requiring contact, for example by means of a technology similar to that used in a computer mouse which allows detecting a bidirectional movement, or by means of a camera connected to an image recognition device configured to detect a bidirectional or tridirectional movement of the tongue or teeth.

The joystick normally integrates four microswitches distributed in a cross shape around same, allowing the detection of the movement of the joystick in any of those four directions and also in any of the intermediate diagonal directions.

The first input interface 21 and the second input interface 22 can be made of respective joysticks, each further including a knob adapted to the ergonomics of the part of the body with which they have to interact, the knob being surrounded by a leak-tight O-ring to prevent saliva from seeping into the casing 10.

It is proposed that the knob to be operated with the tongue includes a rough finish to improve grip, and it is proposed that the knob to be operated with the mandibular dentition includes a relief, for example in a cross shape, or custommade for the dentition of the operator, for optimal grip.

The touch panel can be, for example, a capacitive panel which allows detecting the position and movement of a part of the body of the user on the surface thereof.

When the first input interface 21 is a joystick, it is preferable for said joystick, in a standby position, to be almost parallel to the anteroposterior direction X, allowing the detection of vertical Z and horizontal Y movements.

When the first input interface 21 is a touch panel, it is preferable for the touch panel to be arranged almost perpendicular to the anteroposterior direction X, allowing the detection of vertical Z and horizontal Y movements, or to extend parallel to the roof of the palate, in an almost horizontal direction parallel to the anteroposterior direction X, allowing the detection of movements in the anteroposterior direction X and in the horizontal direction Y.

It is also contemplated that the first input interface 21, and/or the second input interface 22, and/or the third input interface 23 can be a bidirectional or tridirectional magnetic detector in combination with a magnetic element that can be associated with or implanted in the mandibular dentition, the tongue, or the upper and/or lower lips. The magnetic element that can be implanted can be, for example, a magnetic element that can be fixed to a tooth, to the tip of the tongue, or to the upper and/or lower lips, for example by means of a clip, or implanted by way of piercing, or inside a cavity of a tooth, or inside a prosthetic tooth.

Additionally, it is proposed that the first input interface 21, and/or the second input interface 22, and/or the third input interface 23 is a tridirectional input interface or includes a sensor for detecting pressure or a pressing action. A tridirectional sensor allows detecting movements in three directions X, Y, Z orthogonal to one another. This can be achieved, for example, by adding a fifth sensor to a joystick which detects different intensities in a pressure exerted on the joystick in the direction of said joystick, or by using a touch panel with the capacity to perceive different pressure intensities on its surface, or by means of an optical or magnetic sensor that detects the separation existing between the input interface and the mandibular dentition, the tip of the tongue or the lower and/or upper lips, preferably by detecting the movement of these parts of the mouth on the three axes X, Y, Z. Alternatively, a sensor for detecting pressure or a pressing action, for example, a simple button, which allows detecting a pressing action, will be included.

Alternatively, the control device may further comprise a fourth input interface 24 fixed to said casing 10, said fourth input interface 24 being an accelerometer with one axis, three axes, six axes, or nine axes. This will also allow detecting movements or the tilting of the head of the user, thereby adding an additional control.

The device can also include a fifth input interface 25 in connection with the control electronics and attached to the casing 10, the fifth input interface 25 being a microphone connected to a voice recognition device.

As an option, the integration of at least a sixth input interface 26 in connection with the control electronics and attached to the casing 10 in a position adjacent to the first input interface 21 is also proposed, each sixth input interface 26 being a push-button.

According to another embodiment, the device also integrates a seventh input interface 27 in connection with the control electronics and attached to the casing 10, the seventh input interface 27 being a pressure detector for detecting the pressure of the air in the buccal cavity.

According to another embodiment of the invention, the control device may further integrate at least one haptic emitter 40, for example a vibration generator, which will be connected to, and controlled by, the control electronics 30.

When the haptic emitter 40 is a vibration generator, it may be integrated in the first, second, and/or third input interfaces 21, 22, 23, transmitting vibration to the tongue, teeth, or lips of the user.

The casing 10 can also integrate, in connection with the control electronics, at least one bone conduction speaker 41 for the transmission of sounds to the ears through the maxillary dentition.

Optionally, the control electronics 30 can include a wireless signal transmitting antenna for transmitting signals generated by the input interfaces to a remote device to be controlled.

It is also contemplated that the control electronics 30 further integrate at least one electric battery 31 which provides it with a power supply. In this way, the control device can be a wireless and autonomous device. The battery may have charging means, for example a connection port or a wireless induction charger.

Said at least one battery may be housed, for example, on the convex side of the arched casing, said at least one battery being housed between the maxillary dentition and the cheeks of the user. Optionally, the at least one battery will be two batteries arranged on opposite sides of the casing 10.

Evidently, an embodiment lacking a battery and an antenna, connected to an external device to be controlled directly by means of cabling is also contemplated, or a device electrically powered by wireless means, for example by means of electromagnetic induction, from outside the buccal cavity is also contemplated.

According to one embodiment, said rigid frame 12 will form a lower half of the device, with the buccal anchoring being made of a flexible material in the upper half of the casing, welded, adhered, or overmolded above the frame 12.

Alternatively, the frame 12 will be completely embedded in the flexible material forming the buccal anchoring, typically in the upper half of the casing.

The invention claimed is:

1. A mouth-operated control device comprising:
an arched casing defining a concave region and a convex region configured to maintain, in an operating position, at least part of the casing between a maxillary dentition and a mandibular dentition of a user;
a first input interface, at least bidirectional, attached to the casing in the concave region, being accessible to the tongue of the user when the casing is in the operating position;

a second input interface is attached to the casing in the part of the casing configured to be arranged between the maxillary dentition and the mandibular dentition and to be arranged, in the operating position, facing the mandibular dentition of the user, allowing the operation thereof with the relative movement between the maxillary dentition and the mandibular dentition of the user; and control electronics, integrated in the casing, connected to all the input interfaces configured to transmit control signals generated by the input interfaces to an external device;

the second input interface is adapted to detect movements bidirectionally in at least a transverse horizontal axis and in an anteroposterior axis orthogonal to each other and in diagonal directions resulting from the combination thereof.

2. The mouth-operated control device according to claim 1, wherein the control device further comprises one or several of the following elements:

a third input interface in connection with the control electronics and attached to the casing in a third position coinciding with the convex region of the casing, selected to be accessible to the upper and/or lower lips of the user in the operating position;

a fourth input interface in connection with the control electronics and attached to the casing, the fourth input interface being an accelerometer;

a fifth input interface in connection with the control electronics and attached to the casing, the fifth input interface being a microphone, or a microphone adjacent to the first input interface, or a combination of an airflow direction detector and a microphone adjacent to the first input interface, connected to a voice recognition device;

at least one sixth input interface in connection with the control electronics and attached to the casing in a position adjacent to the first input interface, each sixth input interface being a push-button;

a seventh input interface in connection with the control electronics and attached to the casing, the seventh input interface being a pressure detector for detecting the pressure of the air in the buccal cavity.

3. The mouth-operated control device according to claim 1, wherein the casing also integrates, in connection with the control electronics, at least one bone conduction speaker, and/or at least one haptic emitter, or at least one vibration-generating haptic emitter, connected to the control electronics.

4. The mouth-operated control device according to claim 1, wherein the casing comprises:

two flattened side portions, each defining an upper surface intended for being arranged below a side part of the maxillary dentition, a lower surface intended for being arranged above the side parts of the mandibular dentition, with one of the side portions housing the second input interface on the lower surface thereof; and a central portion connecting the two side portions and housing the first input interface.

5. The mouth-operated control device according to claim 4, wherein the central portion is, at least for the most part, above a plane defined by the upper surfaces of the two side portions, the central portion defining a front surface, intended for being arranged facing the inner side of the incisor teeth of the maxillary dentition when in operational position, and a rear surface housing the first input interface.

6. The mouth-operated control device according to claim 1, wherein the casing also includes a dental attachment, or a flexible dental attachment, defining a dental housing intended for housing parts of the maxillary dentition of the user providing fixation of the casing to the maxillary dentition when in the operating position.

7. The mouth-operated control device according to claim 6, wherein the dental attachment or the flexible dental attachment includes:

two facing external retainers protruding from the casing on symmetrical sides of the casing, in the convex region; and/or two internal retainers with their backs facing each other, protruding from the casing on symmetrical sides of the casing, in the concave region.

8. The mouth-operated control device according to claim 7, wherein the casing comprises a frame, or a rigid frame, to which at least part of the control electronics is fixed, and wherein each of the two external retainers and/or each of the two internal retainers are formed by a part of the frame that is coated, at least on a face facing the dental housing, with a flexible, cured moldable or thermoformable material fixed to the frame.

9. The mouth-operated control device according to claim 6, wherein the casing comprises a frame, or a rigid frame, to which at least part of the control electronics is fixed, and wherein the dental attachment is formed by a flexible, cured moldable or thermoformable material fixed to the frame or by a material that is overmolded on top of or around the frame.

10. The mouth-operated control device according to claim 1, wherein the control electronics integrate at least one non-flat molded electronic sheet on which at least most of the components connected to the control electronics are fixed.

11. The mouth-operated control device according to claim 6, wherein the control electronics integrate at least one molded electronic sheet on which at least most of the components connected to the control electronics are fixed and wherein the dental attachment is formed by a flexible, cured moldable or thermoformable material fixed to the mentioned at least one molded electronic sheet or by a material that is overmolded on top of or around the mentioned at least one molded electronic sheet.

12. The mouth-operated control device according to claim 1, wherein the first input interface and/or the second input interface and/or the third input interface is a bidirectional joystick, a bidirectional joystick with a push-button, or a tridirectional joystick, a bidirectional touch panel, a bidirectional touch panel with a push-button, or a tridirectional touch panel, a bidirectional or tridirectional optical motion sensor, or a bidirectional or tridirectional magnetic detector in combination with a magnetic element that can be associated with, or implanted in, the mandibular dentition, the tongue, or the upper and/or lower lips.

13. The mouth-operated control device according to claim 1, wherein the casing further integrates at least one electric battery connected to the control electronics.

\* \* \* \* \*